Figure 1:
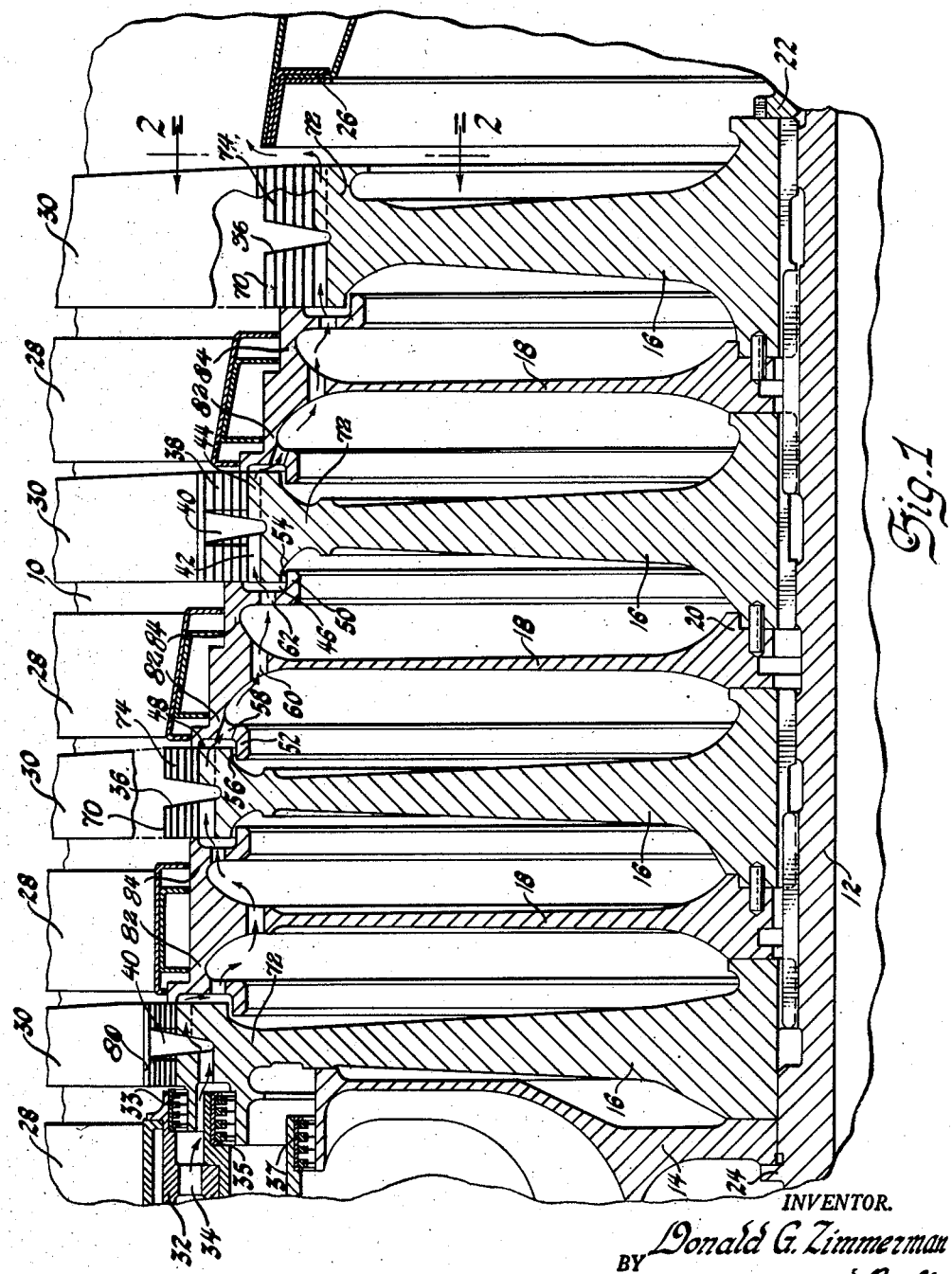

INVENTOR.
Donald G. Zimmerman
BY Willits, Helwig & Baillio
ATTORNEYS

United States Patent Office 2,807,434
Patented Sept. 24, 1957

2,807,434

TURBINE ROTOR ASSEMBLY

Donald G. Zimmerman, Indianapolis, Ind., assignor to General Motors Corporation, Detroit, Mich., a corporation of Delaware Application April 22, 1952, Serial No. 283,611

6 Claims. (Cl. 253—39.15)

This invention relates to elastic fluid rotors and, more particularly, to a gas turbine rotor construction.

An object of my invention is to provide a means whereby a rotor wheel and its associated blading may be efficiently cooled.

Another object of my invention is to provide a means whereby the periphery of a multi-stage axial flow gas turbine rotor may be bathed by a suitable fluid coolant.

Another object of my invention is to reduce the stress concentrations in a multi-stage axial flow gas turbine rotor.

Further objects and advantages of my invention will be apparent from the following description, reference being had to the accompanying drawings wherein a preferred form of my invention is clearly shown.

Figure 2:
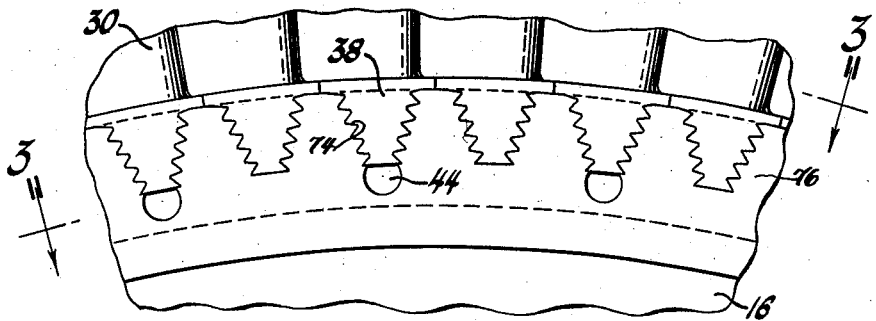
Figure 3:
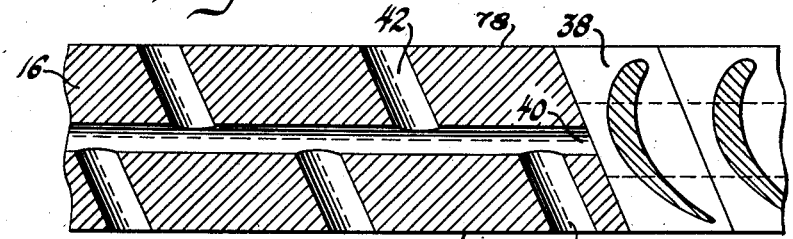
Figure 4:
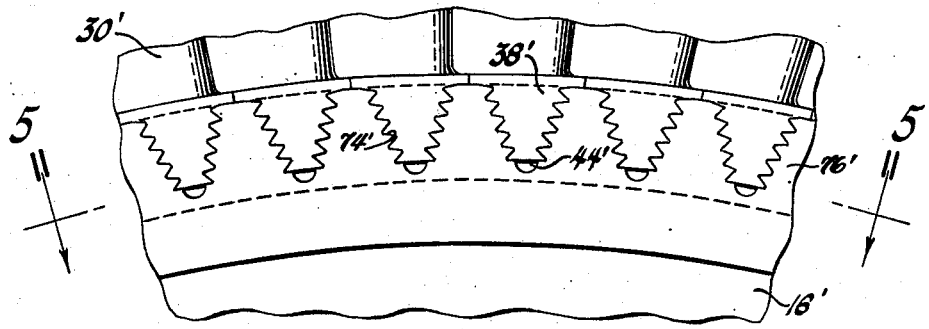
Figure 5:
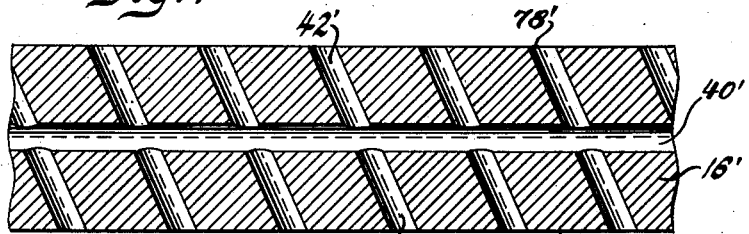

In the drawings:

Figure 1 is a partial axial section of an axial flow gas turbine construction according to my invention, Figure 2 is a partial elevational view taken generally along the line 2—2 of Figure 1, Figure 3 is a partial section taken generally along the line 3—3 of Figure 2, and Figures 4 and 5 are views similar to Figures 2 and 3 illustrating a modified form of my invention.

Referring now to the drawings in detail and more particularly to Figure 1, my invention has been shown as incorporated in a turbine section of an aircraft turbo-propeller engine. Such engines are generally understood to include a propeller, a compressor, a combustor, and a turbine. In operation, the compressor feeds air to the combustor which exhausts through the turbine to drive the compressor and propeller. As these engines are well known, I have illustrated only the turbine section of such an engine, although I wish to point out that my turbine construction is particularly adapted for use in such engines.

The turbine rotor lies in the generally cylindrical turbine casing 10 and includes a hollow shaft 12 at the central portion of the rotor and having mounted thereon a centrifugal fan 14, blade wheels 16, and spacer disks 18. The wheels 16 are splined to the shaft 12 and the spacer disks 18 are shouldered and pinned, as at 20, by pins 21 to the hubs of the wheels 16 for rotation therewith. The fan, and the wheels and spacer disks, are axially restrained on the shaft by a shaft nut 22 and a shaft flange 24 so that the flanges of the wheels and spacer disks are held in engagement. The shaft 12 is supported by bearings (not shown) and is connected to the compressor and propeller as previously noted. The fan 14 draws cooling air over the forward turbine bearing and is not material to the present invention, nor is the usual tailcone 26 that encases the rear bearing and that is suitably supported from the casing 10. Also secured in the casing 10 by suitable means are the usual stator vane assemblies 28 that serve to direct the motive fluid to the moving blade rows 30.

Aircraft gas turbine engines generally compress three to four times as much air as is actually required for combustion. Most of the excess air is used to dilute the combustion products in the combustor to reduce the temperature thereof so as to prevent damage to the turbine, and the remainder is used for various cooling purposes. In accordance with my invention, some of this excess air or air from some other suitable source is led to the ring 32 that is housed in the first-stage stator vane assembly and is fed through an annular series of passages 34 through the turbine rotor to cool the same. The gases from the combustor flow through the annular passage between the casing 10 and the periphery of the turbine rotor and are expanded in the blading system of the turbine in the usual manner. Conventional seals 33, 35 and 37 separate the turbine rotor from the stationary portions of the engine. The seals 33 and 35 prevent the cooling air for the turbine rotor from escaping its flow-path while the seal 37 prevents the escape of the bearing cooling air. The flow of cooling air through the turbine may be readily understood by reference to the flow-path arrows in Figure 1 and the structure of the blade wheels 16 and the spacer disks 18 that make this flow possible will now be described.

The blade wheels 16 have circumferentially extending recesses 36 in the peripheral faces 70 of their rims 72 as is best seen where portions of the blading of the second-stage blade wheel have been broken away. The rims 72 of the blade wheels 16 have grooves or slots 74 that extend axially across their peripheral faces 70 and between their side faces 76 and 78 as best shown by Figures 2 through 4 to support the blade rows 30, the blades having roots 38 of conventional multiple dovetail or fir tree configuration interlocked in the grooves or slots. Referring again to Figure 1, the roots 38 are centrally slotted, see the slot 80 in the first stage blade wheel, so as to bridge the peripheral recesses in the blade wheels 16 to form annular chambers or spaces 40 therewith. The roots 38 and the slots in the blade wheels 16 cooperate to form passages 42 and 44 at the base of the blade root which extend from the chambers 40 to the respective sides of the blade wheels. Figures 2 and 3 illustrate how the passages 42 and 44 may be staggered with respect to each other by locating them under alternate blades so as to increase the circumferential circulation of the fluid coolant in the chambers 40 while Figures 4 and 5 illustrate a modified construction wherein the passages 42' and 44' are in alignment with each other and under each of the blades for simplicity of manufacture. In the construction shown in Figures 4 and 5, the natural turbulence of the flowing fluid coolant will effect some circulation of coolant through the chambers 40 and either construction is satisfactory, although the construction shown in Figures 2 and 3 is preferred.

Referring again to Figure 1, the spacer disks 18 have peripheral flanges 82 and 84 adjacent the rims of the blade wheels 16 to form annular chambers 46 and 48 that are in communication with the passages 42 and 44 in the wheels. The inner edges or lips 50 and 52 of the flanges do not contact the encircling rims of the blade wheels 16 while the turbine rotor is cold and exaggerated clearance spaces are shown at 54 and 56 for illustrative purposes. In operation, the spacer disks 18 have a slightly higher degree of radial expansion than the blade wheels 16 and the clearance spaces at 54 and 56 will insure against the placing of undesirable stresses on the rims of the blade wheels 16 by the spacer disks 18. Previously, the blade wheels and the spacer disks were interlocked at their rims by peripheral tongue and groove connections but I have discovered that such connections are undesirable because of the additional strains which are imposed upon the rims of the blade wheels by the spacer disks and the weakening of the turbine wheel rims by the spacer disks. An annular series of passages 58, 60 and 62 are provided in the flange and disk portions of the spacer disks 18 to interconnect the chambers 46 and 48 so that the fluid coolant may flow therethrough. The passages 58 and 62 may be circumferentially staggered with respect to the passages 42 and 44 to increase the circumferential flow of fluid coolant in the chambers 46 and 48, if desired. In operation, the compressor feeds air through the passages 34 in the ring 32 and through the turbine rotor passages and chambers described above. The air leaves the aft end of the turbine rotor and joins the motive fluid exhaust stream immediately forward of the tailcone 26 as indicated. If desired, hollow blading may be utilized with my blade wheels 16 and the blades may open into the chambers 40 for the entry of fluid coolant into the blades; however, my invention is primarily directed to the cooling of the rims of the blade wheels and the root portions of the blading as both are critical areas.

While the form of embodiment of my invention as herein disclosed constitutes a preferred form, it is to be understood that other forms might be adopted and the invention is not to be regarded as limited by the detailed description.

I claim:

1. An elastic fluid rotor that is subject to high temperatures and including a central portion comprising a shaft, a pair of wheels mounted on said shaft and each having a rim having radially projecting blades secured thereto, said rims having peripheral recesses underlying said blades so as to form annular spaces in said wheels, a spacer disk between said wheels supported from said central portion of said rotor, each of said rims having a side facing said disk, said disk having opposite sides each including an overhanging peripheral flange each having a peripherally grooved side face so contacting an adjacent rim side during operation of said rotor as to form an annular chamber therewith, each of said wheels having passages extending through the spaces and into the adjacent chamber, and said disk and flanges having passages extending therethrough and interconnecting said chambers so that a fluid coolant may be passed through all of said passages and spaces and chambers.

2. An elastic fluid rotor that is subject to high temperatures and including a central portion comprising a shaft, a pair of wheels mounted on said shaft, said wheels having rims with side faces and with peripheral faces having circumferentially extending recesses therein, said rims having annular rows of blade-holding grooves in said peripheral faces that extend between said side faces and that intersect said recesses, blades having root portions disposed in said grooves, said root portions being in local engagement and bridging said recesses so as to form annular spaces within said wheels, a spacer disk between said wheels supported from said central portion of said rotor, said disk having opposite sides each including an overhanging peripheral flange each having a peripherally grooved side face so contacting an adjacent side face of said wheel rims during operation of said rotor as to form an annular chamber therewith, the bottoms of said root portions being radially spaced from the bottoms of said grooves to define passages interconnecting said spaces and said chambers, and said disk and flanges having passages extending therethrough and interconnecting said chambers so that a fluid coolant may be passed through all of said passages and spaces and chambers.

3. An elastic fluid rotor that is subject to high temperatures comprising a shaft, wheels and disks mounted on said shaft in interposed relation, said wheels having rims with side faces and with peripheral faces having circumferentially extending recesses therein, said rims having annular rows of blade-holding grooves in said peripheral faces that extend between said side faces and that intersect said recesses, blades having root portions disposed in said grooves and being in local engagement and bridging said recesses so as to form annular spaces within said wheels, said disks having peripheral flanges having peripherally grooved side faces so contacting said side faces of said rims during operation of said rotor as to form annular chambers therewith, and said wheels and disks and peripheral flanges having passages extending therethrough and interconnecting all of said chambers and spaces so that a fluid coolant may be passed therethrough.

4. An elastic fluid rotor that is subject to high temperatures comprising a rotor rim having side faces and a peripheral face with a circumferentially extending recess therein, said rim having an annular row of blade-holding grooves in said peripheral face that extend between said side faces and that intersect said recess, blades having root portions disposed in said grooves, said root portions being in local engagement and bridging said recess so as to form an annular space within said rotor, some of said grooves on one side of said space being deeper than others of said grooves on that side of said space to form a first set of passages with the bottoms of some of said root portions that extend from said space to one of said side faces, and some of said grooves on the other side of said space being deeper than others of said grooves on that side of said space to form a second set of passages with the bottoms of others of said root portions that extend from said chamber to the other of said side faces whereby said first and second sets of passages are in circumferentially staggered relation.

5. An elastic fluid rotor that is subject to high temperatures comprising a spacer adapted for engagement with a pair of bladed wheels, said spacer including a thin disk having a flanged rim so as to be generally I-shaped in cross-section, said rim having an annular channel in either side, the portions of said rim forming said channels having passages extending therethrough and said disk having passages extending therethrough whereby communication is had between said channels.

6. An elastic fluid rotor that is subject to high temperatures comprising a pair of bladed wheels and an interposed spacer mounted on a shaft for rotation therewith, said wheels having overhanging rims with side faces, said spacer including a thin disk and an overhanging rim with side faces in edge abutment with said side faces of said wheel rims during operation of said rotor, and said spacer rim having peripheral lips projecting therefrom and beneath said wheel rim overhang, said overhang of said wheel rims encircling said peripheral lips on said spacer rim with cold clearance between said peripheral lips and said wheel rims so as to prevent radial stressing of said wheel rims by said spacer rims during high temperature rotor operation.

References Cited in the file of this patent

UNITED STATES PATENTS

| | | |
|---|---|---|
| 2,220,420 | Meyer | Nov. 5, 1940 |
| 2,236,426 | Faber | Mar. 25, 1941 |
| 2,462,600 | Boestad | Feb. 22, 1949 |
| 2,656,147 | Brownhill | Oct. 20, 1953 |
| 2,657,901 | McLeod | Nov. 3, 1953 |

FOREIGN PATENTS

| | | |
|---|---|---|
| 612,097 | Great Britain | Nov. 8, 1948 |